(12) United States Patent  (10) Patent No.: US 8,397,930 B2
Vacca et al.  (45) Date of Patent: Mar. 19, 2013

(54) SAFETY FUEL TRANSPORTATION, STORAGE, AND DELIVERY SYSTEM

(75) Inventors: Giampaolo Vacca, Mason, OH (US);
Jeffrey Poston, Mason, OH (US);
Rongjau Lin, Mason, OH (US)

(73) Assignee: GHT Global Heating Technologies, GmbH, Baar (CH)

( * ) Notice: Subject to any disclaimer, the term of this patent is extended or adjusted under 35 U.S.C. 154(b) by 217 days.

(21) Appl. No.: 12/729,702

(22) Filed: Mar. 23, 2010

(65) Prior Publication Data

US 2010/0236949 A1 Sep. 23, 2010

Related U.S. Application Data

(60) Provisional application No. 61/162,503, filed on Mar. 23, 2009.

(51) Int. Cl.
*B65D 6/00* (2006.01)
*B65D 8/00* (2006.01)
(52) U.S. Cl. ...................................... 220/4.12; 220/565
(58) Field of Classification Search .................. 220/4.12, 220/565, 586; 141/21; 137/67, 255
See application file for complete search history.

(56) References Cited

U.S. PATENT DOCUMENTS

| | | | |
|---|---|---|---|
| 3,317,283 A * | 5/1967 | King | 422/421 |
| 6,440,711 B1 | 8/2002 | Dave | |
| 7,147,955 B2 | 12/2006 | Adams | |
| 2003/0082427 A1 | 5/2003 | Prasad et al. | |
| 2004/0009381 A1 | 1/2004 | Sakai et al. | |
| 2004/0126646 A1 | 7/2004 | Suda et al. | |
| 2004/0209206 A1 | 10/2004 | Hockaday et al. | |
| 2004/0214056 A1 | 10/2004 | Gore | |
| 2005/0023236 A1 | 2/2005 | Adams et al. | |
| 2005/0058874 A1 | 3/2005 | Drake et al. | |
| 2006/0086041 A1 | 4/2006 | Kubota et al. | |
| 2006/0127733 A1 | 6/2006 | Kaschmitter et al. | |
| 2006/0154132 A1 | 7/2006 | Misawa | |
| 2007/0077470 A1 | 4/2007 | Adams et al. | |
| 2007/0095860 A1 | 5/2007 | Adams | |
| 2007/0114485 A1 | 5/2007 | Adams et al. | |
| 2008/0026278 A1 | 1/2008 | Iyoda et al. | |
| 2008/0029156 A1 | 2/2008 | Rosal et al. | |
| 2008/0187810 A1 | 8/2008 | Mergel et al. | |
| 2010/0059039 A1 | 3/2010 | Cudnohoske | |

FOREIGN PATENT DOCUMENTS

WO 2007022504 A2 2/2007

* cited by examiner

*Primary Examiner* — Harry Grosso
(74) *Attorney, Agent, or Firm* — Stephen R. Jenei; Jenei LLC

(57) ABSTRACT

The present invention is an assembly for transporting, storing, and delivering a fuel such that a compromise to the containment of the fuel is readily recognized.

19 Claims, 7 Drawing Sheets

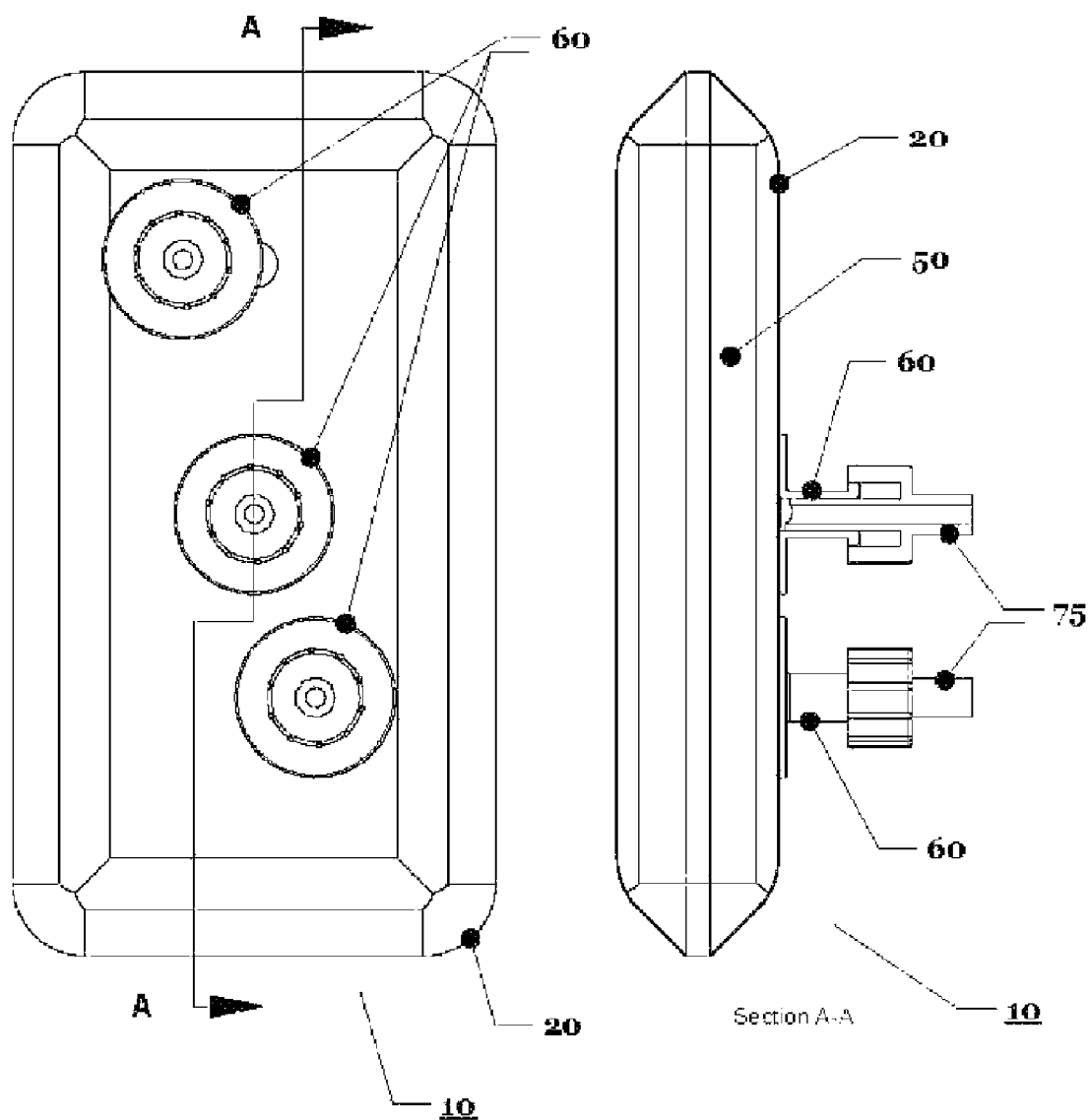

Figure 4
Figure 5
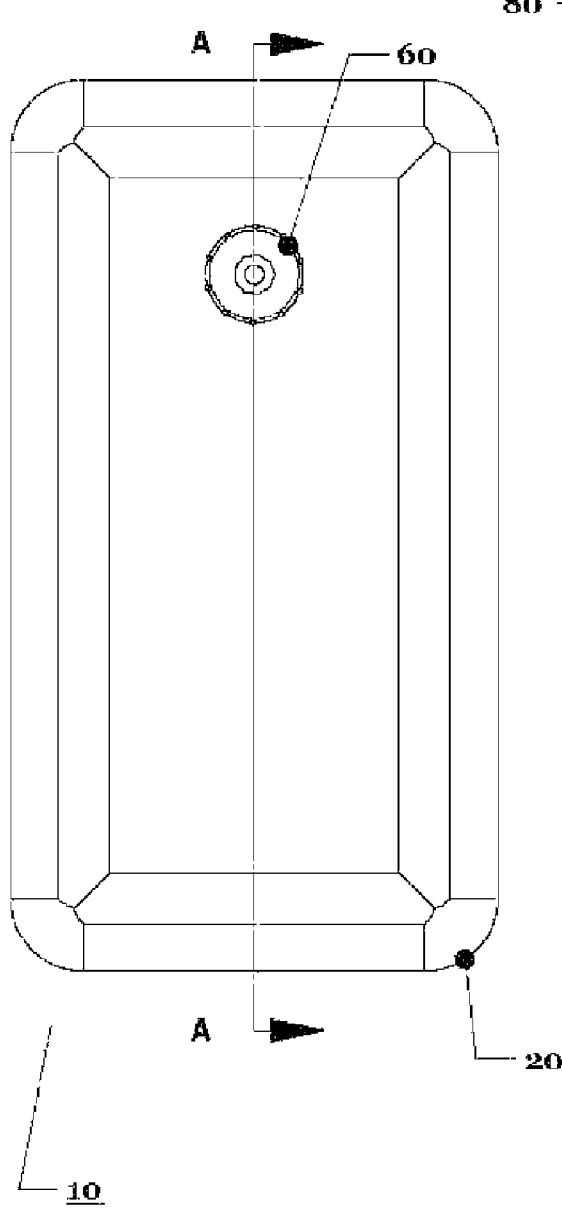
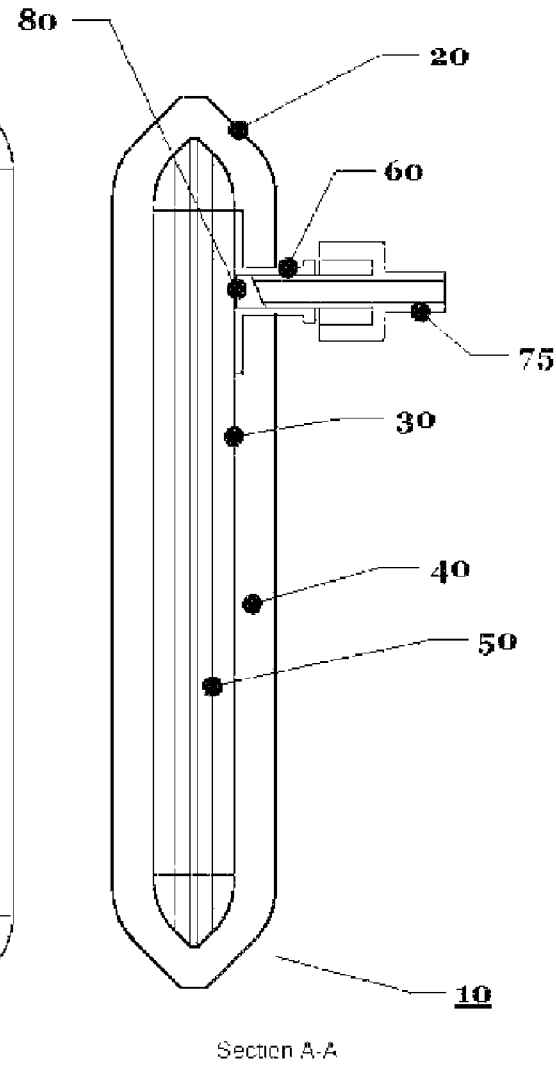
Section A-A

Section A-A

SAFETY FUEL TRANSPORTATION, STORAGE, AND DELIVERY SYSTEM

CROSS-REFERENCE TO RELATED APPLICATION

The present invention claims priority to U.S. patent application Ser. No. 61/162,503 as filed Mar. 23, 2009.

STATEMENT REGARDING FEDERALLY SPONSORED RESEARCH

Not applicable.

NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND ON THE INVENTION

1. Field of the Invention

The present invention relates generally to fuel cartridges for fuel cells and heaters, and more particularly this invention relates to disposable and refillable fuel cartridges. This invention also relates to fuel cartridges for heaters and direct methanol fuel cells.

2. Description of the Related Art

Fuel cells are devices that directly convert chemical energy of reactants, i.e., fuel and oxidant, into direct current (DC) electricity. For an increasing number of applications, fuel cells are more efficient than conventional power generation, such as combustion of fossil fuel and more efficient than portable power storage, such as lithium-ion batteries.

In general, fuel cell technologies include a variety of different fuel cells, including alkali fuel cells, polymer electrolyte fuel cells, phosphoric acid fuel cells, molten carbonate fuel cells, and solid oxide fuel cells. Today's more important fuel cells can be divided into three general categories, namely; fuel cells utilizing compressed hydrogen ($H_2$) as fuel; proton exchange membrane (PEM) fuel cells that use methanol ($CH_3OH$) reformed into hydrogen as fuel' and PEM fuel cells that use methanol ($CH_3OH$) fuel directly (also known as "direct methanol fuel cells" or DMFC). Compressed hydrogen is generally kept under high pressure, and is therefore difficult to handle. Furthermore, large storage tanks are typically required, and cannot be made sufficiently small for consumer electronic devices. On the other hand, fuel cells using methanol reformats require reformers and other vaporization and auxiliary systems thereby increasing the size and complexity of methanol-reformat based fuel cells. DMFC is the simplest and potentially smallest fuel cell, and holds the most promising power application for consumer electronic devices.

What is desired is a safer and more economical means for storing, transporting, and delivering methanol fuel such that any damage to a device storing, transporting, and delivering methanol that compromises the containment of the methanol is readily recognized.

SUMMARY

Various exemplary embodiments of the present invention include an assembly for transportation, storage and delivery of fuel for heating, cooling, fuel cell, thermo-electric and other applications. However the exemplary assemblies herein may also be used with other liquid chemicals as well.

Various exemplary embodiments of the present invention may include an assembly having only one enclosure. In other exemplary embodiments, a second enclosure may be included inside a first enclosure. Or, multiple inner enclosures may be used as needed.

BRIEF DESCRIPTION OF THE DRAWINGS

The various exemplary embodiments of the present invention, which will become more apparent as the description proceeds, are described in the following detailed description in conjunction with the accompanying drawings, in which:

FIG. 1 is an illustration of an exemplary embodiment of a front face of present invention having only one sealed enclosure.

FIG. 2 is an illustration of an exemplary embodiment of a cut-away side view along line A of FIG. 1.

FIG. 4 is an illustration of an exemplary embodiment of a front face of present invention having more than one inner sealed enclosure.

FIG. 5 is an illustration of an exemplary embodiment of a cut-away side view along line A of FIG. 4 and showing an inner enclosure and an outer enclosure.

DESCRIPTION OF THE REFERENCED NUMERALS

Figure 3:
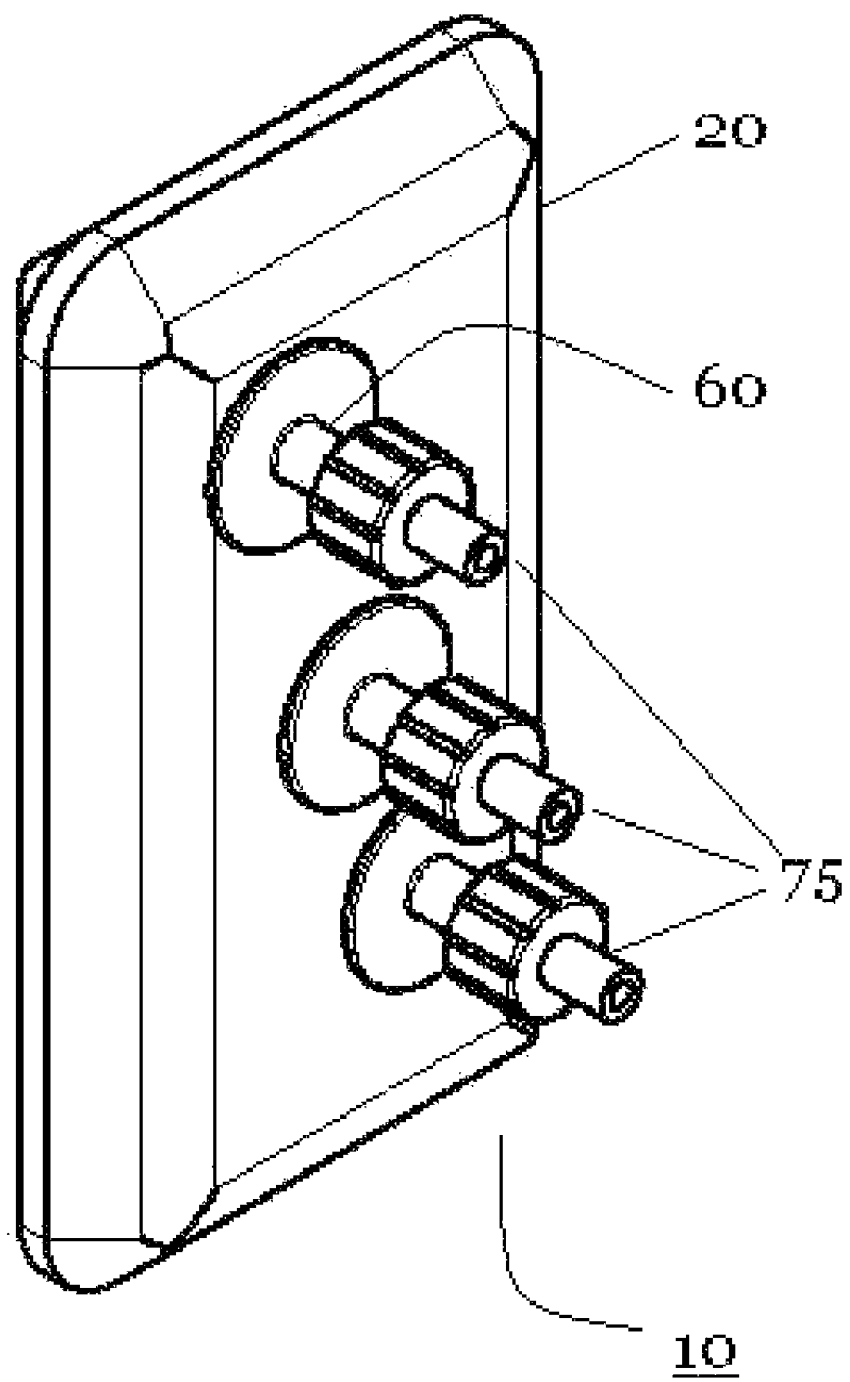
FIG. 3 is an illustration of another exemplary embodiment of a perspective view of the exterior of the present invention having only one sealed enclosure.

In reference to the drawings, similar reference characters denote similar elements throughout all the drawings. The following is a list of the reference characters and associated element:

10 Fuel cartridge
20 Outer enclosure
30 Inner enclosure
35 Middle enclosure
40 Absorbent
50 Fuel
55 Pressurization means
60 Inlet/Outlet
70 Vent
75 Connector
80 Area for rupture

DETAILED DESCRIPTION

In exemplary embodiments of the present invention, an assembly for transporting, storing, and/or delivering fuel may be comprised of a single sealed enclosure. Such exemplary embodiment is illustrated in FIGS. 1-3.

In the exemplary embodiments in which the assembly is composed of a single sealed outer enclosure 20. The enclosure may be composed of one or more soft or rigid plastics, or any other materials that are nonreactive to an associated fuel stored within the enclosures. A preferred material for the composition of the enclosure would be, self sealing, able to prevent leakage, or slow down leaking in case the enclosure is damaged. The assembly could be equipped with at least one inlet/outlet 60. Vents 70 or other inlet/outlet 60, if required, can be constructed and positioned as desired in similar manner as the outlets.

In FIGS. 1 and 2, fuel 50 is sealed inside the sealed outer enclosure 20 during manufacturing of the assembly. The illustrated exemplary embodiment of FIGS. 1 and 2 also includes three inlets/outlets 60 and/or vent 70 having connectors 75 attached and securely sealed on the outer enclosure 20. The inlet/outlet 60 and/or vent 70 may be positioned anywhere on the outer enclosure 20 as needed or desired. The actual number of inlet/outlet 60 and/or vent 70 connectors may vary. The inlet/outlet 60 and/or vent 70 may be used, for example, for venting, assisting in the outlet of fuel, being a main outlet of fuel, being an inlet for adding fuel, or a combination thereof. Though the Figures illustrate all of the inlet/outlets 60 and/or vents 70 identically, they need not be identical, and it may even be preferable that they differ in order that they are properly connected. This can also be achieved via a single, multi ported connector, side by side and/or coaxial in design.

Figure 6:
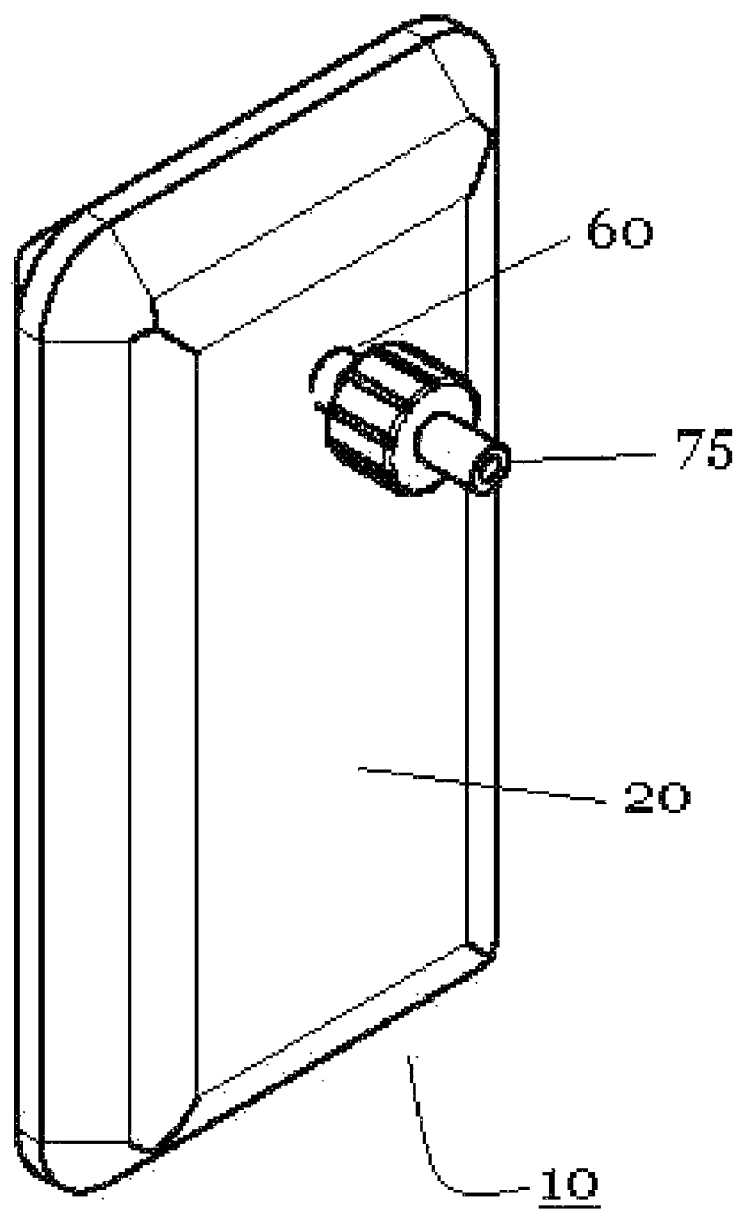
FIG. 6 is an illustration of another exemplary embodiment of a perspective view of the exterior of the present invention having more than one inner sealed enclosure.

In other exemplary embodiments, the assembly may have an inner enclosure 30 within an outer enclosure 20. Such exemplary embodiment is illustrated in FIGS. 4-6.

The second sealed enclosure allows fuel 50 to be placed within two sealed enclosures in order to substantially diminish the potential for spill, increase evidence of a spill, pressurize the contained fuel, etc. The fuel is normally stored in the inner enclosure 30, but the fuel can be contained between the inner enclosure 30 and the outer enclosure 20.

Both the inner enclosure 30 and the outer enclosure 20 may be composed of one or more soft or rigid plastics, or any other materials that are nonreactive to the associated fuel and depending upon the use of the specific design. A preferred material for the composition of both enclosures would be, self sealing, able to prevent leakage, or slow down leaking in case an enclosure is damaged.

If the fuel is stored between the inner enclosure 30 and the outer enclosure 20, then the inner enclosure 30 can be used to install the pressurization means 55. The fuel can be delivered in a controlled way by the pressurization means 55.

If the fuel is stored in the inner enclosure 30, an absorbent material may be placed between the inner enclosure 30 and the outer enclosure 20 for leakage protection. The absorbent material can be porous glass fiber, Instr-Snow powder partially filled with water, chemicals which solidify when in contact with fuel, toxicity neutralizing means if fuel is toxic, fire retardant, foaming agents, or any material which would serve for these purposes.

Additionally, if the fuel is stored in the inner enclosure 30, a pressurization means 55 in the form of, for example, a spring, a sponge, a gas producing chemical reaction, etc. may be placed between the inner enclosure 30 and the outer enclosure 20 in order to deliver the fuel out of the enclosure to the application.

FIGS. 4 and 5 illustrate an exemplary embodiment in which an inner enclosure is sealed within an outer enclosure. Fuel 50 is sealed inside the inner enclosure 30, preferably during manufacturing. A fuel inlet/outlet 60 may be attached and securely sealed on the inner enclosure 30, shown at arbitrary location. There may or may not be a hole into the inner enclosure 30. The inlet/outlet 60 goes through the outer enclosure 20 and absorbent 40. If required, the inlet/outlet 60 can be sealed on the outer enclosure 20 as well. Between the inner enclosure 30 and the outer enclosure 20 is the absorbent 40. The absorbent 40 functions to assist in substantially limiting leaking of the fuel 50 and may provide evidence of actual leaking of the fuel from the inner enclosure 30. If fuel 50 leaks by, for example, puncture, the absorbent 40 will hinder the fuel either physically or chemically to reduce or eliminate a fuel spill outside of the outer enclosure 20. As in FIG. 1, the assembly could be equipped with more than one inlet/outlet 60 connectors and or vents 70 as needed at any locations, connected to any enclosure of the assembly.

In other exemplary embodiments, the assembly may have multiple inner sealed enclosures within the outer enclosure 20. Such exemplary embodiment is illustrated in FIGS. 7-9.

Figure 7:
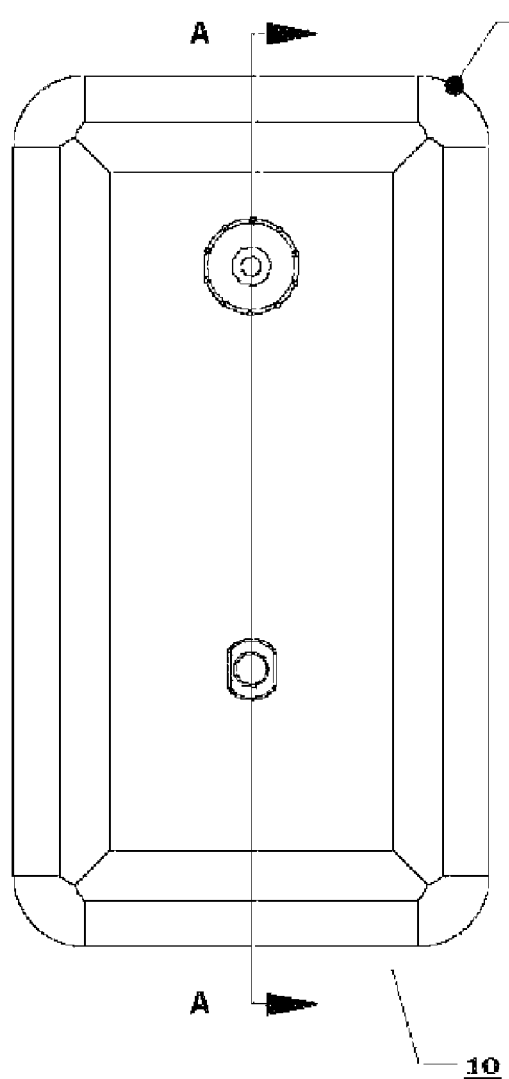
FIG. 7 is an illustration of an exemplary embodiment of a front face of present invention having more than one inner sealed enclosure and an inner sponge.
Figure 8:
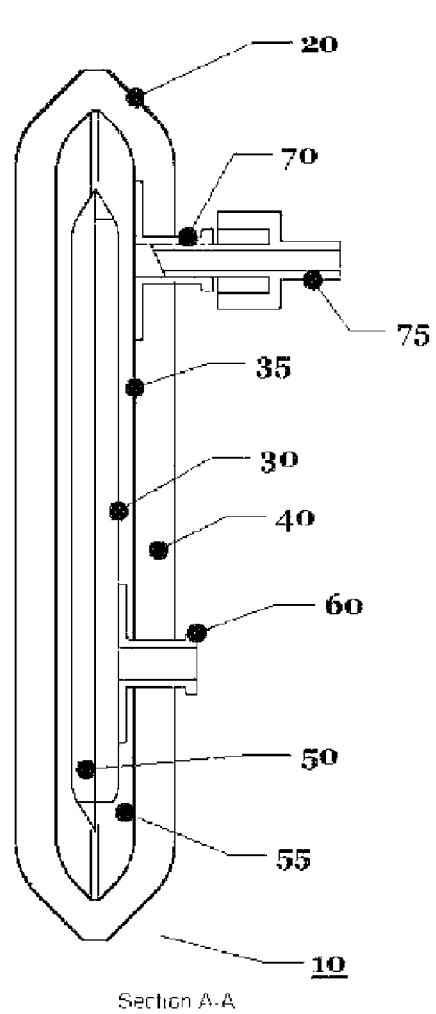
FIG. 8 is an illustration of an exemplary embodiment of a cut-away side view along line A of FIG. 7 and showing an inner sealed enclosure, a middle enclosure, and an outer enclosure.
Figure 9:
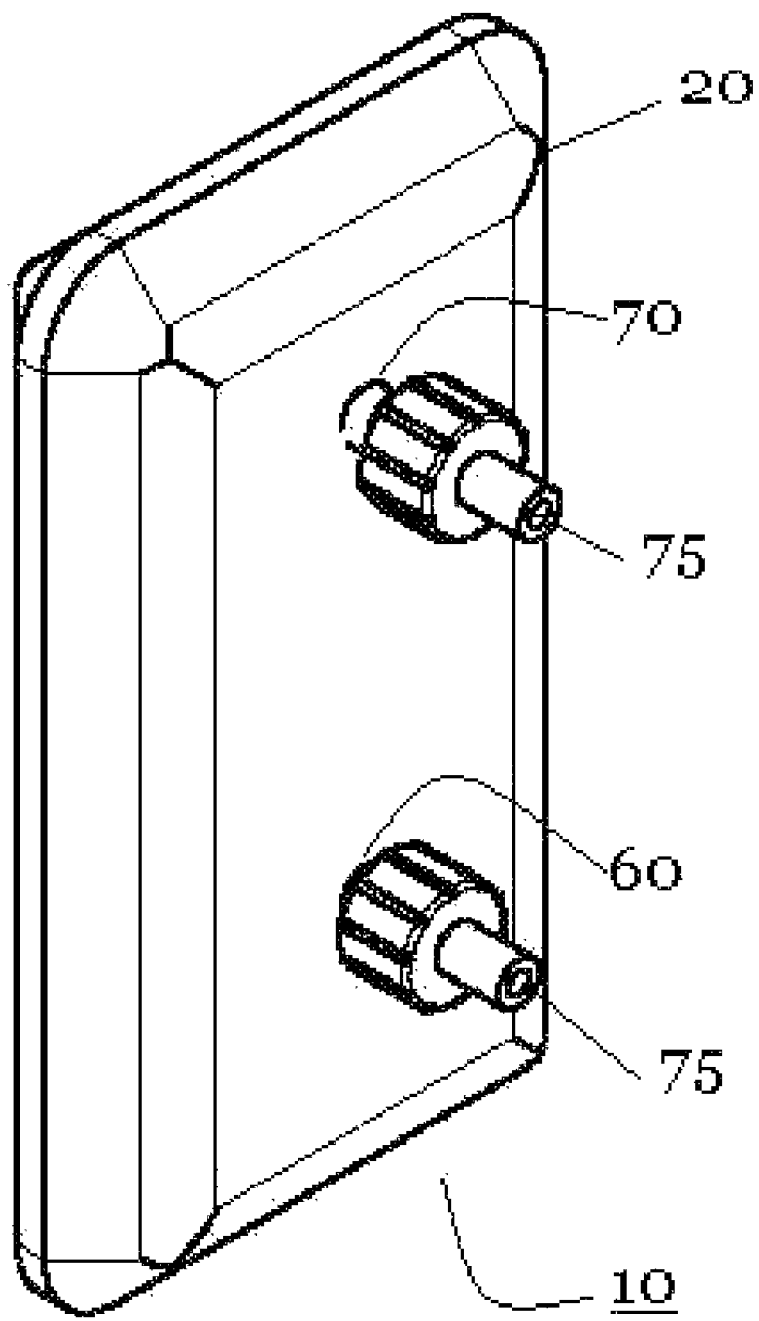
FIG. 9 is an illustration of another exemplary embodiment of a perspective view of the exterior of the present invention having more than one inner sealed enclosure and an inner sponge.

As illustrated in FIGS. 7 and 8, there can be, for example, two inner sealed enclosures, an inner enclosure 30 and a middle enclosure 35. The middle enclosure 35 may be for pressurization, and the inner enclosure 30 may be for fuel. Or, in another embodiment, the middle enclosure 35 can be used to store fuel, the inner enclosure 30 may be for pressurization, and the outer enclosure 20 may be for leakage prevention. However, the enclosures can be used in any order and there is not a limit, per se, on the number of inner enclosures that the design or assembly may have.

FIGS. 7 and 8 illustrate an exemplary embodiment having two inner sealed enclosures. Fuel 50 may be sealed in the inner enclosure 30, preferably during manufacturing. Between the inner enclosure 30 and the middle enclosure 35 may be a compressed sponge, or other pressurization means 55, here held compressed by a vacuum. The absorbent 40 is placed between the middle enclosure 35 and the outer enclosure 20 for leak prevention and or detection and or detoxification and or reduction. An inlet/outlet 60 is attached and securely sealed on the inner enclosure 30, to allow the fuel to be used out of the inner enclosure 30, shown at arbitrary location. The inlet/outlet 60 goes through the outer enclosure 20, absorbent 40, middle enclosure 35, and pressurization means 55. If required, the inlet/outlet 60 can be sealed on one or more of the outer enclosures. A vent 70 is sealed to the middle enclosure 35. This vent 70 goes through the outer enclosure 20 and the absorbent 40, and may be sealed to the outer enclosure 20 as needed. The vent 70 sealed to the middle enclosure 35 is opened during use to gradually allow air or other gas to fill the sponge allowing it to expand and hence pressurize the fuel. Another exemplary embodiment would have the fuel between the middle enclosure 35 and the inner enclosure 30 and the sponge, or other pressure creator would be contained in the inner enclosure 30.

As in FIGS. 1 and 2, the assembly illustrated in FIGS. 7 and 8 could be equipped with more than one inlet/outlet 60 and or one or more vent 70 as needed at any locations in any enclosure of the assembly.

When multiple enclosures are used the fuel 50, absorbent 40 and pressurization means 55, can each be placed in almost any of the sealed enclosures depending on numerous factors and intended uses.

Figure 10:
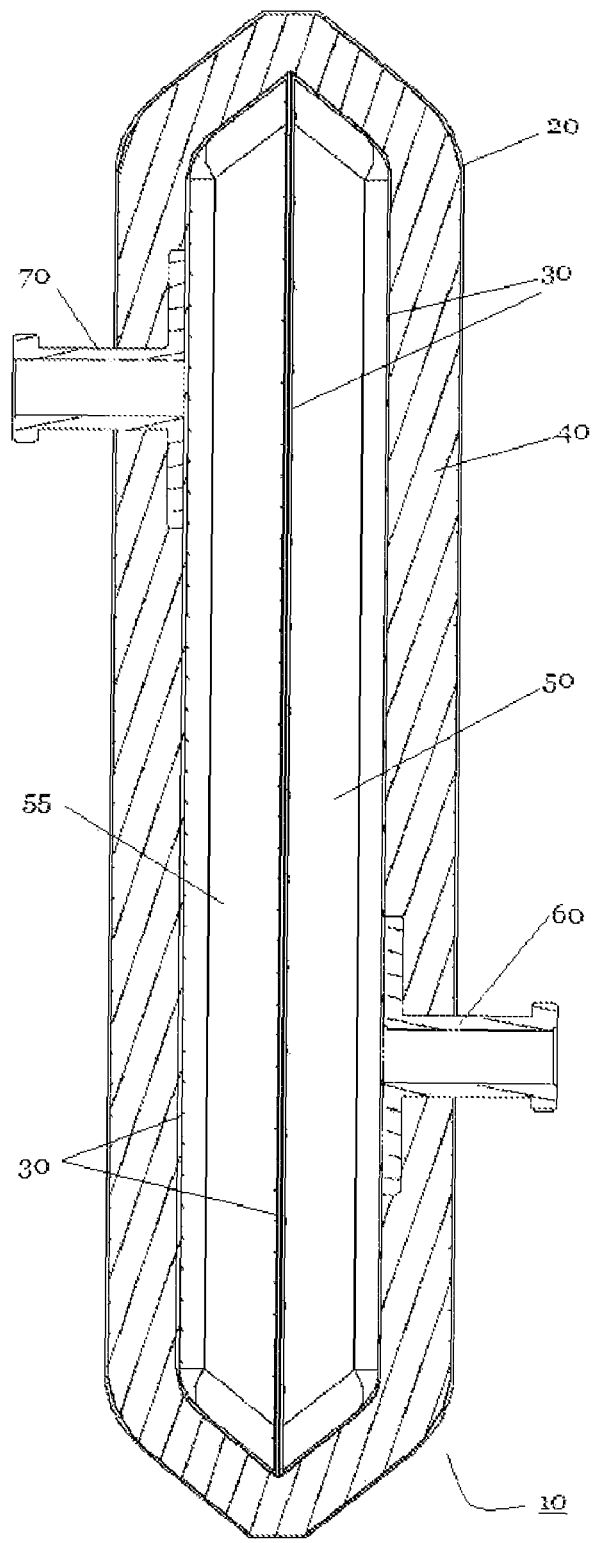
FIG. 10 is an illustration of an exemplary embodiment of a cut-away side view of the present invention having two inner enclosures sealed by the outer enclosure.

FIG. 10 illustrates that multiple inner enclosures 30 can be placed side by side within the outer enclosure 20 without the inner enclosures 30 being one inside the other as illustrated in FIG. 8. The function of the pressurization means 55, etc. is the same as with the inner enclosure 30 inside a middle enclosure 35 described above. However, the one or more vent 70 and inlet/outlets 60 do not need to be sealed when passing through the middle enclosure 35. Therefore, depending on the application this may be more desirable.

The absorbent material is preferably a fuel-loving material which can absorb many times its own weight in fuel. It can be a material chemically cross-linkable with the fuel, cellulose-like material (e.g., wood pulp, glass fiber) which holds and spreads fuel without chemical reaction or both. Another alternate can be a hydrophilic polymer and a fibrous material such as wood pulp which are partially saturated with water during fuel cartridge manufacturing. The methanol, or other type of fuel, will be absorbed in the hydrophilic absorbent with the aid of water once a leak occurs. The hydrophilic polymer can be, for example, sodium acrylate, potassium acrylate, alkyl acrylate, and the like. In case water is used as part of the absorbent, an acid chemical like vinegar, salt or some other mold prevention additives can be used to prevent mold appearance. The salt can be, for example, sodium chloride, potassium permanganate, and the like. Salt or other antifreeze can be added for applications used below the freezing point. The Instr-Snow powder, or other absorber, partially filled with water, or if water itself is used as the absorber, not only acts as absorbent for fuel, but in this state it also helps prevent fire/combustion if leakage happens. As a water soluble fuel leaks into the water, or water enhanced absorber the fuel is diluted into the water and becomes less flammable.

The absorbent material can also include other flame retardants such that a leak of fuel from the inner enclosure will mix with the flame retardant to reduce or eliminate the flammability of the fuel.

The absorbent material may be comprised of substances that reduce or eliminate toxicity of the fuel or other fluid inside. For example, in the case of methanol, certain enzymes can be added to the absorbent such that in the case of a leak the enzymes break down the methanol through natural processes giving off nonflammable, nontoxic byproducts, such as, for example, carbon dioxide ($CO_2$). Other methods of detoxifying the fluid could also be employed. The exact methods are dependent upon the exact fluid to be detoxified.

The enclosures can be bags, boxes, and the like of any shape. The materials can be rigid or breakable such as, for example, glass, hard plastic; or flexible such as, for example, plastics, rubber, and self sealing material. For example, polyethylene (PE) or polypropylene (PP) can be used as a flexible or rigid enclosure to contain fuel, absorbent, or pressurization means if such is the design.

Another example is to use glass or otherwise breakable material as an inner enclosure and the outer enclosure could be made of soft or flexible materials. Fuel or other component is stored inside the glass enclosure during manufacturing. The inner sealed glass enclosure is broken by twist or other means just before use and the fuel or other material (such as a vinegar for one of the below pressurization methods) can be delivered into an outer cavity for the start of a chemical reaction or simply to make it available for use.

The pressurization methods for the fuel may be, for example, gravity, sponge, spring, pump, chemical reaction, and the like. For example, by placing a vacuumed sponge (compressed, and held so by a bag or other enclosure sealed such that no air can get in) in an inner sealed enclosure, the vacuumed sponge can be used to pressurize the fuel once a vent valve is opened, or some part of the bag or an attachment thereto is cut or otherwise opened into the enclosure housing the sponge allowing air or other gas or liquid at a higher pressure than the internal vacuum of the enclosure holding the sponge to enter, thus allowing the sponge to expand providing pressure for the fuel. Alternatively the sponge's (or other pressurizing means 55) pressure could be released at time of manufacture and the fuel could be shipped under pressure. Another example for pressurizing the fuel is mixing vinegar or other acid with baking soda in a controlled way to produce carbon dioxide gas in an inner enclosure to pressurize the fuel. Another example for pressurizing fuel is by way of gravity. This can be accomplished by raising a portion of the assembly or by placing the assembly in a certain orientation causing the fuel enclosure to be higher than the point at which the fuel is used, the fuel could then be delivered in a favored controlled way. For another example a portion of a body's or product's mass, or the entire product's mass, could be used to pressurize the fuel. For example if one were heating a room with a liquid fueled space heater the flexible or partially moveable as a piston, for example, fuel enclosure could be placed on the bottom of the entire space heater, either designed and mounted on the bottom or placed under the unit by operator, thus allowing some or all of the mass of the entire heater to pressurize the fuel. The fuel enclosure could be placed higher, even on the top of the unit, and a rod (or other mechanical device) protruding from the bottom could transfer pressure up to the fuel enclosure. This pressure can be sufficient to push fuel up a fuel line to a point higher than the fuel enclosure for use.

One embodiment, for example, places a vacuumed sponge 55 in an inner enclosure 30, to which a sealed vent 70 is connected. The vacuumed sponge can be used to pressurize the fuel once the vent 70 is opened, or some part of the inner enclosure 30 or an attachment thereto is cut or otherwise opened to air or other gas or liquid at a higher pressure than the internal vacuum of the enclosure holding the sponge.

For spill evidence, when the outer enclosure is partially or totally transparent or translucent, as examples, the fuel can be colored with dye, or some color change material like a PH indicator or colored beads coated with fuel soluble lacquer can be placed in the outer enclosure 20 with the absorbent material, or in a separated enclosure. In the lacquer example, the absorbent can be of a light color, perhaps white, while the lacquer is of a contrasting darker color, perhaps red. In the event of a spill the lacquer will dissolve into the fuel causing a noticeable discoloration on the absorbent. Some additives useful for PH indicator, if the fluid has a PH which will indicate, may be, for example, neutral red, methyl red, phenolphthalein, and the like. If the fuel leaks, the color should be evident through the transparent or translucent sealed enclosure containing the color change material. Another example, especially if the fuel is PH neutral, is to add a pH indicator material into the fuel and have a suitable acid or basic solution in the absorbent material of the outer enclosure 20. If the fuel leaks, the pH indicator will react with a color in the absorbent material and should be visible through a transparent or translucent outer enclosure 20. Or the mild acid or base could be added to the fuel and the pH indicator could be in the absorbent 40 material.

The inlet/outlet 60 connectors and vents 70 can be constructed using a thread design, snap-in, toggle fastener, barbed connector, or other means. The inlet/outlet 60 connector can be sonic welded (or otherwise attached and sealed) to the enclosure without making a hole in the area for rupture 80 in the enclosure at time of manufacture so the fuel is substantially sealed in. The hole in the fuel enclosure can be created by puncture or otherwise at the time of use. This can be accomplished by the connector 75 being attached. Such connector may be of any means for removing fuel such as, for example, via an attached hose. This puncture or otherwise opening of the enclosure can be used on a fuel enclosure to reduce the chances of leak during shipment, etc. as well as other enclosures such as an enclosure containing a sponge in a vacuum for use as a pressurization means 55, so that when the connector 75 is attached air or other fluid is allowed to enter the enclosure allowing the sponge to expand and pressurize the fuel. The inlet/outlet 60 can have flow selector. It this way the user can adjust the flow rate of the fuel based upon, for example the number of turns the treads are engaged. And any suitable pressurization system can be used to pressurize the fuel. Vents 70, if required, can be constructed in similar manner as the inlet/outlet 60. It may be advantageous, depending on the application, to have a check valve or other spill reduction system incorporated into inlet/outlets 60 and vents 70.

The assembly could be equipped with as many inlet/outlets 60, and or as many vents 70 as needed at any locations on any enclosure of the assembly.

Even though the combustion may complete, the product of carbon dioxide can be harmful to human body particularly for indoor application. It might be necessary to use materials such as, for example, ascarite or zeolite in the exhaust area to absorb carbon dioxide and then later release it outdoors.

For consistency in descriptions the liquid to be shipped, stored, delivered, etc. via this invention has been referred to as "fuel". The invention could be used for any number of liquids which pose some danger, etc. if leaked. Therefore, any occurrence of the word "fuel" can be interchanged with any liquid which could be protected by such an invention.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention.

The invention claimed is:

1. A container for storing, transporting, and delivering a water soluble fuel, the container being comprised of:
   an outer enclosure;
   at least one inner enclosure fully encased by the outer enclosure;
   a hydrophilic absorbent material sealed between the at least one inner enclosure and the outer enclosure;
   one or more pressurization means sealed within the outer enclosure or within the at least one inner enclosure; and
   at least one inlet/outlet means having a connector or another means of removing the fuel such as a hose attached;
   wherein the enclosures which are exposed to the fuel are substantially non-reactive to the fuel, and the fuel may be sealed within the outer enclosure or within the at least one inner enclosure;
   wherein at least part of the outer enclosure is transparent or translucent to allow witness to visible changes in the absorbent material;
   wherein the hydrophilic absorbent material is partially saturated with water in an amount sufficient to substantially increase the rate the absorbent material will absorb the water soluble fuel and reduces the flammability of a hydrophilic fuel; and
   wherein the absorbent is coated with a color change material which provides for visible changes in the absorbent material upon contact with an appropriate fuel.

2. The container according to claim 1, wherein the hydrophilic absorbent material partially saturated with water comprises one or more materials selected from the group consisting of cellulose-like material, hydrophilic polymer, fibrous material, material chemically cross-linkable when in contact with fuel, and combinations thereof.

3. The container according to claim 2, wherein the hydrophilic polymer is sodium acrylate, potassium acrylate, alkyl acrylate, or a combination thereof.

4. The container according to claim 3, wherein the water soluble fuel is methanol and wherein the hydrophilic absorbent material further comprises one or more additional agent selected from the group consisting of toxicity neutralizing agents, fire retardant agents, foaming agents, mold prevention agents, acids, bases, salts, anti-freeze agents and combinations thereof.

5. The container according to claim 2, wherein the one or more pressurization means is gravity using the mass of a body to rest on the enclosure encasing the fuel in order to pressurize the fuel, one or more sponges, one or more springs, one or more pumps, one or more chemical reactions, or a combination thereof.

6. The container according to claim 5, wherein the one or more chemical reactions produces a gas, such as carbon dioxide to pressurize the fuel.

7. The container according to claim 5, wherein the one or more sponges are in a substantially compressed state until the enclosure in which the one or more sponges is unsealed thereby allowing the one or more sponges to expand and pressure the fuel.

8. The container according to claim 2, wherein there are two inner enclosures fully encased by the outer enclosure.

9. The container according to claim 2, wherein the at least one inner enclosure is fully encased by a middle enclosure, which is fully encased by the outer enclosure.

10. The container according to claim 9, further comprising an absorbent material sealed between the middle enclosure and the outer enclosure, the fuel sealed between the middle enclosure and the outer enclosure, and a pressurization means sealed within the at least one inner enclosure.

11. The container according to claim 9, further comprising an absorbent material sealed between the middle enclosure and the outer enclosure, a pressurization means sealed between the middle enclosure and the outer enclosure, and the fuel sealed within the at least one inner enclosure.

12. The container according to claim 9, further comprising a pressurization means sealed between the middle enclosure and the outer enclosure, an absorbent material sealed between the middle enclosure and the outer enclosure, and the fuel sealed within the at least one inner enclosure.

13. The container according to claim 2, wherein the outer enclosure, the at least one inner enclosure, or a combination thereof are comprised of one or more soft or rigid plastics and are self-sealing.

14. The container according to claim 2, wherein the at least one inner enclosure is comprised of a glass or breakable material that can be broken prior to use in order to precipitate a chemical reaction, such as for pressurization, or to otherwise allow access to the contents of the breakable enclosure.

15. The container according to claim 2, further comprising one or more vents.

16. The container according to claim 2, wherein the outer enclosure and or one or more inner enclosures are made of a self sealing self-sealing material.

17. A container for storing, transporting, and delivering fuel, the container being comprised of:
   an outer enclosure;
   at least one inner enclosure fully encased by the outer enclosure;
   an absorbent material sealed between the at least one inner enclosure and the outer enclosure;

one or more pressurization means sealed within the outer enclosure or within the at least one inner enclosure; and at least one inlet/outlet means having a connector or another means of removing the fuel such as a hose attached;

wherein the enclosures which are exposed to the fuel are substantially non-reactive to the fuel, and the fuel may be sealed within the outer enclosure or within the at least one inner enclosure;

wherein at least part of the outer enclosure is transparent or translucent to allow witness to visible changes in the absorbent material;

wherein the absorbent is coated with a color change material which provides for visible changes in the absorbent material upon contact with an appropriate fuel;

wherein the absorbent material comprises one or more materials selected from the group consisting of water, glass fiber, cellulose-like material, hydrophilic polymer, hydrophilic polymers partially filled with water, fibrous material, material chemically cross-linkable when in contact with fuel, toxicity neutralizing means, fire retardant, foaming agent, mold prevention means, acids, bases, salt, anti-freeze materials and combinations thereof; and wherein the wherein the color change material is a pH indicator, or a combination thereof.

18. The container according to claim 17, wherein the pH indicator is a dye.

19. A container for storing, transporting, and delivering fuel, the container being comprised of:

an outer enclosure;

at least one inner enclosure fully encased by the outer enclosure;

an absorbent material sealed between the at least one inner enclosure and the outer enclosure;

one or more pressurization means sealed within the outer enclosure or within the at least one inner enclosure; and at least one inlet/outlet means having a connector or another means of removing the fuel such as a hose attached;

wherein the enclosures which are exposed to the fuel are substantially non-reactive to the fuel, and the fuel may be sealed within the outer enclosure or within the at least one inner enclosure;

wherein at least part of the outer enclosure is transparent or translucent to allow witness to visible changes in the absorbent material;

wherein the absorbent is coated with a color change material which provides for visible changes in the absorbent material upon contact with an appropriate fuel;

wherein the absorbent material comprises one or more materials selected from the group consisting of water, glass fiber, cellulose-like material, hydrophilic polymer, hydrophilic polymers partially filled with water, fibrous material, material chemically cross-linkable when in contact with fuel, toxicity neutralizing means, fire retardant, foaming agent, mold prevention means, acids, bases, salt, anti-freeze materials and combinations thereof; and wherein the color change material comprises a fuel soluble lacquer coating over a colored absorbent substrate, where the lacquer itself may contain a separate coloring agent.

* * * * *